United States Patent

Wytovak et al.

[11] Patent Number: 5,727,760
[45] Date of Patent: Mar. 17, 1998

[54] BOW HANGER

[75] Inventors: Rogge L. Wytovak; Shannon M. Wytovak, both of 3020 Hartmetz, Evansville, Ind. 47712

[73] Assignees: Rogge L. Wytovak; Shannon M. Wytovak, both of Evansville, Ind.

[21] Appl. No.: 621,004

[22] Filed: Mar. 22, 1996

[51] Int. Cl.$^6$ .................................... F16L 3/08
[52] U.S. Cl. ................ 248/217.3; 248/230.8; 182/187
[58] Field of Search ............ 248/217.3, 301, 248/306, 328, 230.8, 230.9; 124/23.1, 86; 182/187

[56] References Cited

U.S. PATENT DOCUMENTS

| | | | |
|---|---|---|---|
| 3,345,028 | 10/1967 | Lawrie | 248/230.8 |
| 3,746,294 | 7/1973 | Johnston | 248/230.8 |
| 4,722,501 | 2/1988 | Ruhl | 248/230.8 |
| 5,117,779 | 6/1992 | Karow | 248/230.8 |
| 5,310,151 | 5/1994 | Ensel | 248/230.8 |

Primary Examiner—Ramon O. Ramirez
Assistant Examiner—Willie Berry, Jr.

[57] ABSTRACT

A bow hanger for hanging bows and hunting equipment from a tree or pole. The bow hanger differs from prior art in that the bow hanger is collapsible into a smaller length package than prior art. Also the bow hangar arm can be adjusted for height without disturbing the means of attaching to a tree or pole.

2 Claims, 3 Drawing Sheets

BOW HANGER

BACKGROUND OF THE INVENTION

(1) Field of the Invention

The present invention is a means of hanging items off a tree or pole as a convenience to people such as hunters or campers. Such items include, but are not restricted to, bows, arrows, quivers, canteens, backpacks, laundry, firearms, food, lanterns, camp showers, clothing, and other items such as would be convenient for hunters or campers. The present invention also serves as a hanger for items other than convenience items for hunters or campers. For example, homeowners might want to use the present invention to hang bird feeders or potted plants.

(2) Description of Prior Art

Prior to the present invention,. bow hunters did not have as convenient a way to hang a bow so that it could be quickly and quietly put into action by the bow hunter. Bow holders existed which mounted on a floor of a tree stand, but the bow was not held as securely as in the case of the present invention. Also, floor mounted bows have undue and harmful stress in the bow's limb while so mounted. The present invention permits positioning of the bow right in front of the bow hunter, easily accessible with minimum movement by the bow hunter to access the bow. To the inventors' knowledge, this is a unique product.

SUMMARY

The present invention is a means of securely holding a bow in a manner convenient to a bow hunter in a tree stand. The present invention is collapsible for transport and storage.

The present invention takes only seconds to install on a tree or pole and does not penetrate or otherwise damage the tree or pole. Tree damage is a concern to a landowner. Avoiding tree damage addresses the landowner's concern which makes it easier for the bow hunter to obtain hunting privileges. Addressing landowners' concerns fosters multiple land use which is important as population pressures increase and land available for recreational purposes decreases. The present invention includes a tension member, a compression member, and a hanger secured together by a bracket, a means of securing the tension member to the tree or pole, and various hooks for the purpose of hanging various items.

DESCRIPTION OF THE PREFERRED EMBODIMENTS

Figure 1:
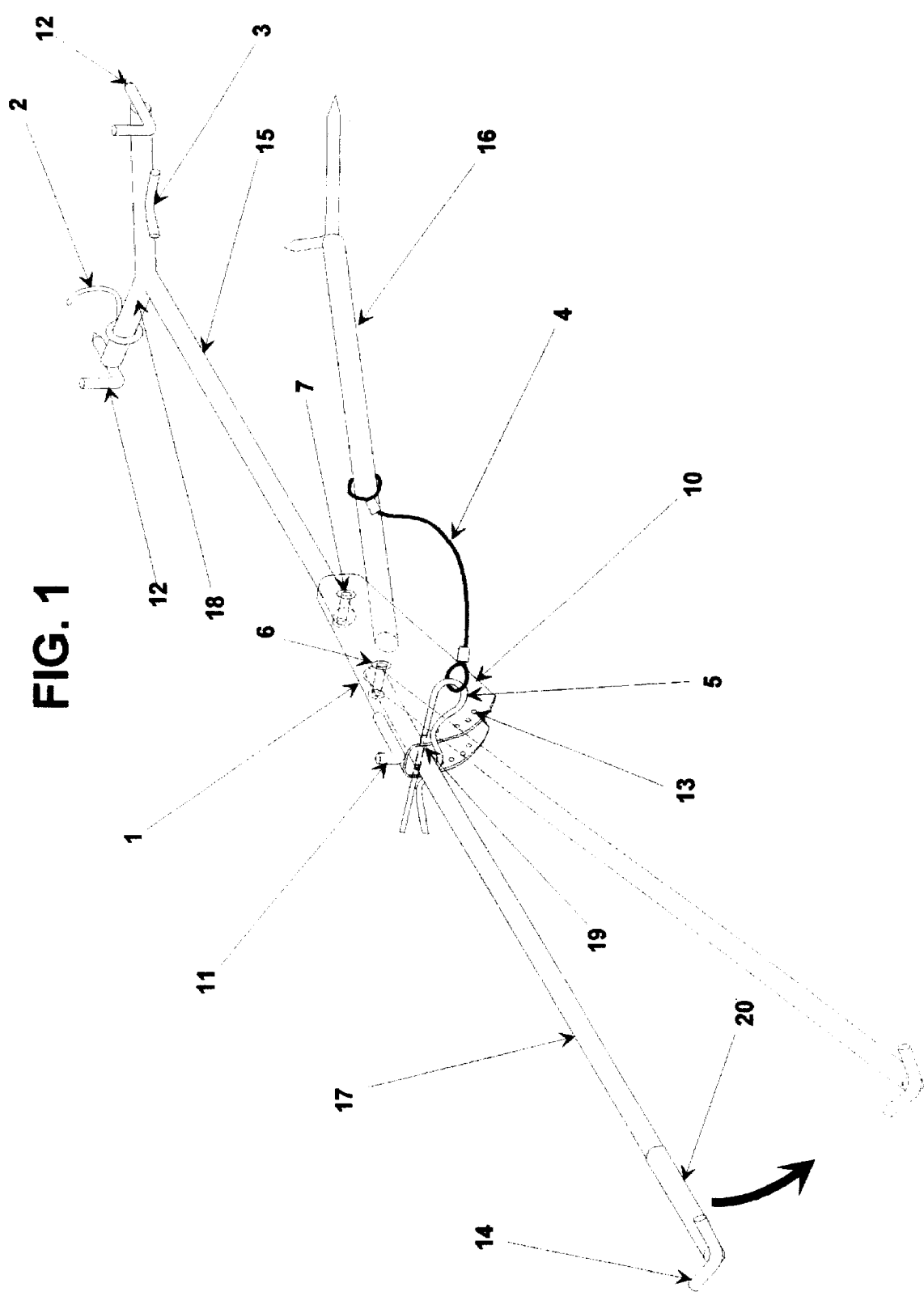
FIG. 1 shows the present invention.

Referring to FIG. 1, the present invention, a bow hanger 1 in the preferred embodiment, includes a cord 2, a cleat 3, a lanyard 4, a positioning pin 5, a hanger pivot pin 6, an arm pivot pin 7, a bracket 10, utility hooks 12, clearances 13, a main hook 14, an arm 15, a brace 16, a hanger 17, a saddle 18, and a coating 20. The bracket 10, in the preferred embodiment of the present invention, includes, clearances 13, and an optional utility hook 11. The arm 15, in the preferred embodiment of the invention, includes light utility hooks 12 and a saddle 18 as well as the previously mentioned cleat 3.

Figure 3:
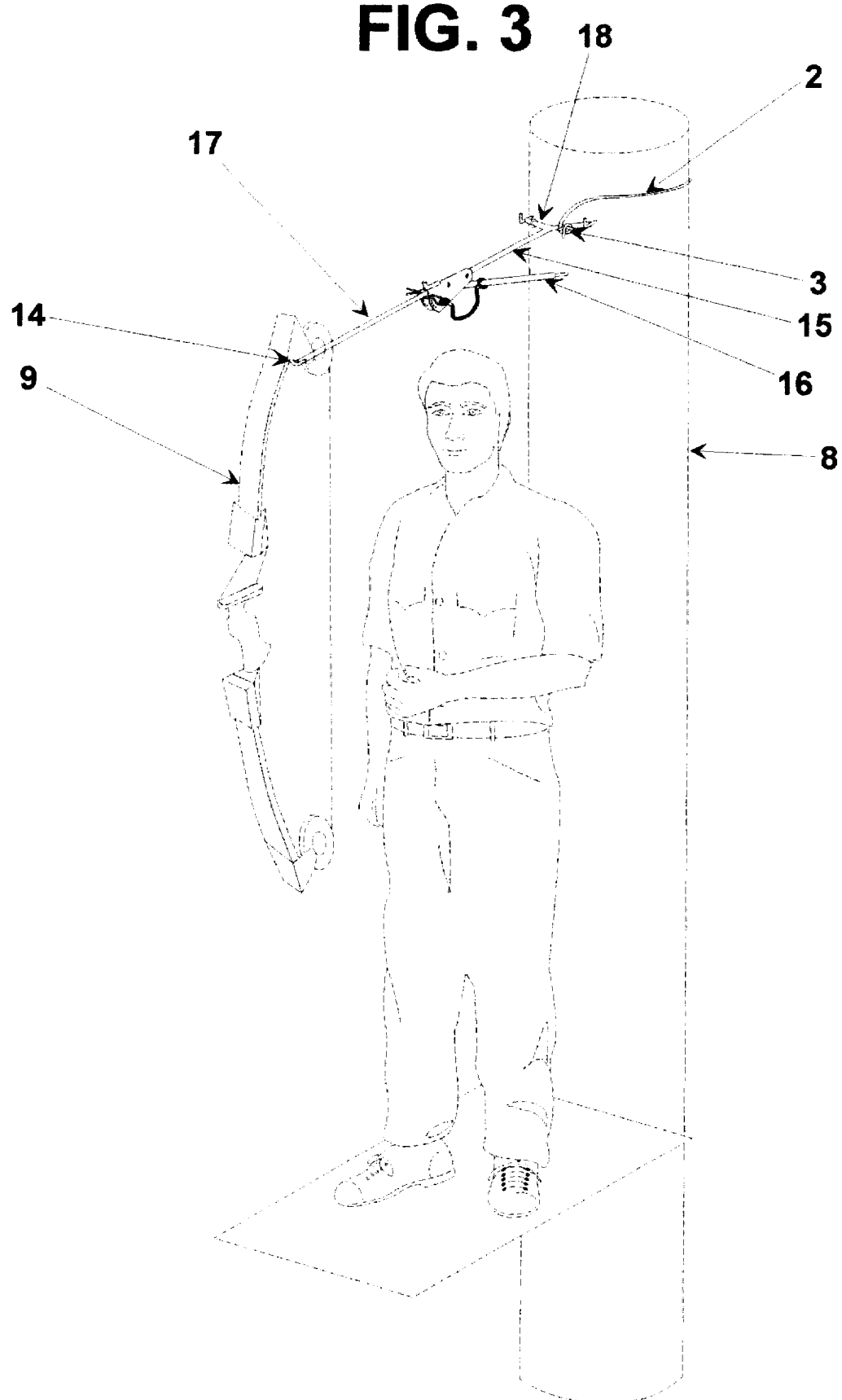
FIG. 3 shows the present invention installed.

The hanger 17 is pinned to the bracket 10 by the hanger pivot pin 6 and held in position by the positioning pin 5 which is inserted through the clearances 13 of the bracket 10 and through an aperture 19 contained in the hanger 17. Also, the main hook 14 and a portion of the hanger 17 are dipped in a coating 20. The coating 20 serves as protection for a bow or other item to avoid damage from the main hook 14 or the hanger 17. In the preferred embodiment of the present invention, the coating can be either rubber or plastic, although, as obvious to anyone skilled in the art, other coatings serve the same purpose. As the bracket 10 has multiple clearances 13, the hanger 17 can be raised or lowered to a variety of positions. In the preferred embodiment of the invention, seven sets of clearances, 11 degrees apart are used, but as obvious to anyone skilled in the art, a different number of clearances or angle degrees can be used. The pin 5 goes through the hanger 17 so the hanger 17 is held in position, so the hanger 17 does not go up as an item such as a bow 9 as shown in FIG. 3 is removed from the main hook 14. The lanyard 4 is used as a safety line securing the positioning pin 5 to the bow hanger 1 to avoid losing said positioning pin 5. As shown in FIG. 1, The hanger pivot pin 6 pins the hanger 17 in the bracket 10. Except when limited by the positioning pin 5, or the brace 16, the hanger arm 17 is rotatable within the bracket 10. Similarly, the arm 15 is pinned to the bracket 10 by the arm pivot pin 7. The arm 15 is rotatable within the bracket 10 except as limited by the brace 16.

In the operation of the bow hanger 1, in the preferred embodiment of the invention, as indicated in FIG. 3, the saddle 18 is placed against a tree 8, with the brace 16 also against the tree 8. In the preferred embodiment of the invention, the brace 16 is forked as shown in FIG. 1, so as to diffuse the load on the tree 8. The cord 2 is wrapped around the tree 8, and then is secured to the cleat 3. The one end of the cord 2 is secured to the cleat 3 while the other end of the cord is secured to the saddle 18, kept from coming off the saddle 18 by the utility hook 12 located near that end of the cord 2. The cord 1 secures the arm 15 to the tree 8. A bow 9 can be hung off the main hook 14. Other items can be held by the utility hook 11 or the light utility hooks 12. The arm 15 is in tension, serving as a tension member. The cord 2 will also be in tension, securing the arm 15 to the tree 8. The brace 16 is held in compression by gravity, said brace 16 serving as a compression member. Obviously, to anyone skilled in the state of the art of bow hangers, additional hooks can be attached or located as desired.

FIG. 3 shows the bow 9 hanging on the main hook 14 of the hanger 17, said bow 9 aligned with and positioned in front of the bow hunter so that the bow 9 is easily accessible with a minimum of movement by the bow hunter.

Figure 2:
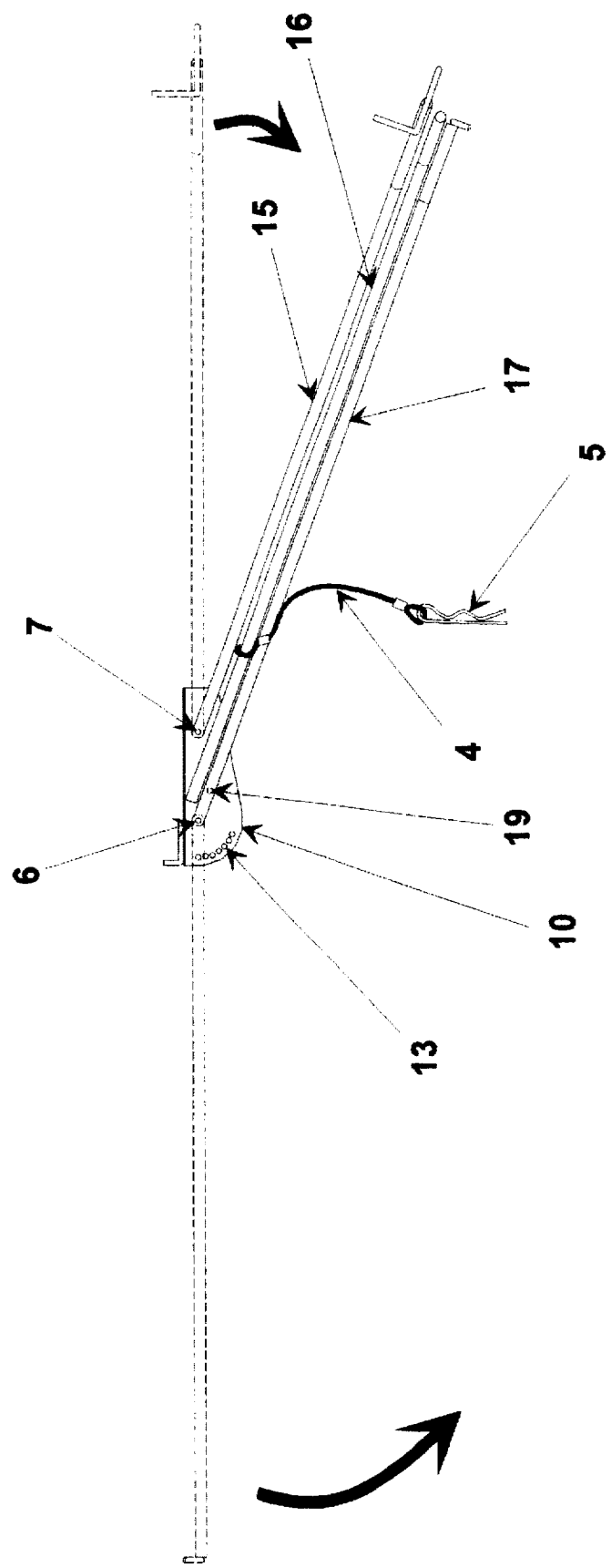
FIG. 2 shows the present invention collapsed.

The bow hanger 1 can be collapsed, as shown in FIG. 2 for ease of transport and storage. The positioning pin 5 is removed from the bracket 10 and then the hanger 17 is rotated until it abuts the brace 16. The arm 15 is rotated until it abuts the brace 16.

In the preferred embodiment of the invention, the materials of construction are steel, except for the cord 2, which is nylon and the lanyard 4 which is a flexible steel cable, and the coating 20. However, as obvious to anyone skilled in the state of the art, other materials, such as fiberglass, plastics, aluminum, as examples, can serve the same purpose.

While the present invention is intended for hanging bows for bow hunters, it also serves other purposes. Other items hung from the bow hanger 1 as limited only by the imagination. For example, the bow hanger 1 can be used to hang a planter, a flower pot, or a bird feeder from a tree in a back yard when not required for hunting purposes.

Although the description above contains many specificities, these should not be construed as limiting the scope of the invention but as merely providing illustrations of some of the presently preferred embodiments of this invention. For example, additional hooks could be added or the optional utility hook 11 removed. Also, a ratchet head could be used instead of pin 5 through the clearances 13 for positioning the hanger 17. Or, a projection and groove combination combined with a bolt and a wing nut could be used to secure the hanger 17 within the bracket 10. Also, instead of the cord 2, a flat strap, or a rope, or a chain, or a wire, or any flexible means that could be fastened to the saddle 18 then wrapped around the tree 8 and then secured to the saddle 18 to secure the saddle 18, and thus the arm 15 to the tree would serve the same purpose. While the brace 16 is not shown as pivotable within the bracket 10, and the hanger 17 and the arm 15 are shown as pivotable within the bracket 10, it is obvious to anyone skilled in the state of the art that the brace 16 could also be pivotable within the bracket 10. As long as any two of the arm 15, brace 16, and hanger 17 are pivotable, the bow hanger 1 is collapsible, which is desirable for transport and storage. While a rod is indicated in the drawing for each of the arm 15, brace 16, and hanger 17, pipe, or channel, or tubing, or some other structural shape would serve the same purpose. Thus the scope of the invention should be determined by the appended claims and their legal equivalents, rather than by the examples given.

We claim:

1. A device for hanging a bow from a tree, said device comprising:
   a) a tension member which can be secured to the tree,
   b) a brace which is held against the tree in compression by gravity acting on the device, said brace being forked at one end so as to diffuse the compression load from the weight of the device,
   c) a hanger with a main hook for supporting said bow in such a manner that a minimum of movement is required by a bow hunter to remove said bow from said hanger with a main hook and use said bow for its intended purpose,
   d) a bracket to which the tension member, the brace, and the hanger are attached in such a manner that each of the tension member, the brace, and the hanger can be pivoted around each of their respective connections to the bracket for the purposes of saving space during transport or shipping, wherein said bracket has clearances which permit adjustments to the height of one end of said hanger by pinning the hanger to whichever of the clearances within the bracket is desired for a given height, said adjustment of the hanger end height being possible without disturbing either the tension member which is secured to the tree or the compression member which is held in compression by gravity against the tree,
   e) a means for securing the tension member to the tree, and
   f) at least one utility hook for hanging items other than said bow.

2. A device for hanging a bow from a tree or pole, said device comprising:
   a) a tension member which can be secured to the tree,
   b) a brace which is held against the tree in compression by gravity, said brace being forked at one end so as to diffuse the compression load on the tree from the weight of the device,
   c) a hanger with a main hook for supporting said bow in such a manner that a minimum of movement is required by a bow hunter to remove said bow from the hanger with a main hook and use said bow for its intended purpose,
   d) a bracket to which the tension member, the brace, and the hanger are attached in such a manner that each of the tension member, the brace and the hanger can be pivoted around each of their respective connections to the bracket for the purposes of saving space during transport or shipping, wherein said bracket has clearances which permit adjustments to the height of one end of said hanger by pinning the hanger to whichever of the clearances within the bracket is desired for a given height, said adjustment of the hanger end height being possible without disturbing the tension member or the brace which are in position against the tree, and
   e) a means securing the tension member to the tree.

* * * * *